US012484937B2

United States Patent
Owusu-Danquah et al.

(10) Patent No.: US 12,484,937 B2
(45) Date of Patent: Dec. 2, 2025

(54) METAL PLATE WITH ONE-WAY SHAPE MEMORY EFFECT

(71) Applicant: Cleveland State University, Cleveland, OH (US)

(72) Inventors: Josiah S. Owusu-Danquah, Mayfield Heights, OH (US); Brian L. Davis, Moreland Hills, OH (US); Tanetta L. Curenton, Parma, OH (US)

(73) Assignee: CLEVELAND STATE UNIVERSITY, Cleveland, OH (US)

( * ) Notice: Subject to any disclaimer, the term of this patent is extended or adjusted under 35 U.S.C. 154(b) by 423 days.

(21) Appl. No.: 17/249,417

(22) Filed: Mar. 2, 2021

(65) Prior Publication Data

US 2021/0267644 A1 Sep. 2, 2021

Related U.S. Application Data

(60) Provisional application No. 62/983,881, filed on Mar. 2, 2020.

(51) Int. Cl.
| | |
|---|---|
| *A61B 17/80* | (2006.01) |
| *A61B 17/70* | (2006.01) |
| *F03G 7/06* | (2006.01) |
| *A61B 17/00* | (2006.01) |
| *A61B 17/56* | (2006.01) |

(52) U.S. Cl.
CPC .......... *A61B 17/7059* (2013.01); *F03G 7/065* (2013.01); *A61B 2017/00867* (2013.01); *A61B 2017/564* (2013.01)

(58) Field of Classification Search
CPC ............ A61B 17/7059; A61B 17/8004; A61B 2017/564; A61B 2017/568; A61B 17/66; A61B 17/7077; A61B 17/8023
See application file for complete search history.

(56) References Cited

U.S. PATENT DOCUMENTS

| | | | | |
|---|---|---|---|---|
| 5,242,759 A | * | 9/1993 | Hall | B23K 35/004 |
| | | | | 427/310 |
| 5,423,849 A | * | 6/1995 | Engelson | A61B 17/12172 |
| | | | | 606/198 |
| 5,551,871 A | * | 9/1996 | Besselink | A61B 17/7001 |
| | | | | 606/78 |
| 7,070,599 B2 | * | 7/2006 | Paul | A61B 17/7059 |
| | | | | 606/294 |
| 7,240,677 B2 | * | 7/2007 | Fox | A61B 17/68 |
| | | | | 606/54 |
| 7,618,441 B2 | * | 11/2009 | Groiso | A61B 17/7059 |
| | | | | 606/301 |
| 7,875,033 B2 | | 1/2011 | Richter et al. | |
| 8,409,286 B2 | * | 4/2013 | McKay | A61F 2/4455 |
| | | | | 623/17.15 |

(Continued)

OTHER PUBLICATIONS

Petrini, Lorenza et al., "Biomedical Applications of Shape Memory Alloys", Journal of Metallurgy, vol. 2011, Article ID 501483, 15 pages.

(Continued)

*Primary Examiner* — Anu Ramana
(74) *Attorney, Agent, or Firm* — Lippes Mathias LLP (57) ABSTRACT

A metal plate contains a shape memory alloy (e.g., a nitinol alloy) capable of exhibiting the one-way memory effect.

8 Claims, 5 Drawing Sheets

(56) References Cited

U.S. PATENT DOCUMENTS

| | | | |
|---|---|---|---|
| 2002/0007184 A1* | 1/2002 | Ogilvie | A61B 17/7022 606/151 |
| 2004/0034354 A1* | 2/2004 | Paul | A61B 17/7059 606/70 |
| 2005/0240190 A1* | 10/2005 | Gall | A61B 17/7225 606/301 |
| 2008/0269753 A1* | 10/2008 | Cannestra | A61B 17/8004 606/280 |
| 2008/0269808 A1* | 10/2008 | Gall | A61B 17/7225 606/301 |
| 2010/0063506 A1* | 3/2010 | Fox | A61B 17/0642 606/151 |
| 2010/0268278 A1* | 10/2010 | Foley | A61B 17/7059 606/264 |
| 2013/0103087 A1* | 4/2013 | Grizzard | A61B 17/7068 606/279 |
| 2013/0310880 A1 | 11/2013 | Ruiz | |
| 2017/0100173 A1 | 4/2017 | Abdelgawad et al. | |
| 2018/0055444 A1* | 3/2018 | Windolf | A61B 5/0031 |

OTHER PUBLICATIONS

Lin, Dasheng et al., "Pediatric Physeal Slide-traction Plate Fixation for Comminuted Distal Femur Fractures in Children", Pediatr Orthop, vol. 32, No. 7, Oct./Nov. 2012, 5 pages.

Kocaoglu, Baris et al., "The Effect of Therapeutic Ultrasound on Metallic Implants: A Study in Rats", Arch Phys Med Rehabil, vol. 92, Nov. 2011, 5 pages.

* cited by examiner

METAL PLATE WITH ONE-WAY SHAPE MEMORY EFFECT

The present application claims the priority benefit of U.S. Provisional Patent Application Ser. No. 62/983,881, filed Mar. 2, 2020, the disclosure of which is incorporated by reference herein.

BACKGROUND

The present disclosure relates to metal plates containing a shape memory alloy (e.g., a nitinol alloy) capable of exhibiting the one-way shape memory effect. Methods of lengthening the plates are also disclosed. Lengthening may unforced or forced. The plates and methods may be useful for orthopedic and other applications.

Pediatric fractures involving the growth plate (part of the bone where growth occurs) are difficult to repair because metal plates that are needed for stabilizing the fracture hinder subsequent growth of the bone. There are two solutions that have been previously used: (i) remove the plate after a period of about 2 months, and (ii) use an orthopedic implant that can lengthen from outside the body. The disadvantages of each of these approaches are as follows: (i) for the former, two surgeries are needed, and (ii) for the latter, rods need to penetrate through the skin, thus posing a risk for infection.

Scoliosis is characterized by a lateral curvature and vertebral rotation. Scoliosis typically worsens with age in untreated patients and is associated with a number of different negative consequences. Known treatment methods are often cumbersome and inefficient.

It would be desirable to develop new metal plates and methods of using the same which overcome the aforementioned deficiencies of known plates and methods. For example, it would be desirable to develop new orthopedic plates for treating growth plate issues or scoliosis.

BRIEF DESCRIPTION

Disclosed, in some embodiments, is a plate containing a shape memory alloy capable of exhibiting the one-way shape memory effect.

The plate may be an orthopedic plate.

The one-way shape memory effect may involve widening one or more elements of the plate and/or lengthening the plate. In some embodiments, the alloy exhibits superelasticity.

The plate may include a first plate element capable of exhibiting the one-way shape memory effect and a second plate element incapable of exhibiting the one-way shape memory effect.

In some embodiments, the shape memory alloy is a nitinol alloy.

The nickel-tin alloy may contain from about 30 wt % to about 70 wt % tin, including from about 35 wt % to about 65 wt % tin, from about 40 wt % to about 60 wt % tin, from about 45 wt % to about 55 wt % tin, from about 46 wt % to about 54 wt % tin, from about 47 wt % to about 53 wt % tin, from about 48 wt % to about 52 wt % tin, from about 49 wt % to about 51 wt % tin, and about 50 wt % tin. The upper and lower limits from these different ranges may be combined in some embodiments.

Disclosed, in other embodiments, is a method of lengthening a plate. The method includes heating the plate comprising a one-way shape memory alloy to induce a shape change.

The shape change may permit the plate to lengthen without forcing the plate to lengthen.

Alternatively, the shape change may force the plate to lengthen.

The plate and at least one substrate to which the plate is secured may be examined prior to and/or after heating. The substrate may be a bone.

The heating may include a single heating step.

Alternatively, the heating may include a plurality of incremental heating steps wherein the heating temperature is increased slightly for each successive step.

In some embodiments, the plate is anchored on opposite sides of a growth plate and/or a fracture.

Disclosed, in further embodiments, is a scoliosis treatment method. The method includes applying a first plate to a first vertebra to be straightened, the first plate comprising a one-way shape memory alloy; and heating the first plate, thereby forcing a lengthening of the first plate and a straightening of the first vertebra.

In some embodiments, the one-way shape memory alloy is a nitinol alloy.

The method may further include applying a second plate to a second vertebra to be straightened, the second plate comprising the one-way shape memory alloy; and heating the second plate, thereby forcing a lengthening of the second plate, and straightening the second vertebra.

The first and second vertebra may be adjacent.

In some embodiments, the first plate and the second plate are heated independently.

The first plate and the second plate may be subjected to different heating profiles.

Heating can occur in a single step or in multiple steps, e.g., by heating the plate from body temperature to 38° C., and then (later) to 39° C., up to temperatures of 41° C. However, larger, and smaller increments are also contemplated. For example, the temperature increase may be in the range of 0.01° C. to 2° C., including from about 0.05° C. to about 1.5° C., from about 0.1° C. to about 1° C., from about 0.2° C. to about 0.9° C., from about 0.3° C. to about 0.8° C., from about 0.4° C. to about 0.7° C., and from about 0.5° C. to about 0.6° C. The upper and lower limits from these different ranges may be combined in some embodiments. The number of steps may be in the range of from 1 to about 5, including from 1 to 3. Embodiments with 1, 2, 3, 4, and 5 steps are expressly contemplated. However, more than 5 steps are also expressly contemplated.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

The present disclosure may be understood more readily by reference to the following detailed description of desired embodiments included therein and the drawings. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

Unless indicated to the contrary, the numerical values in the specification should be understood to include numerical values which are the same when reduced to the same number of significant figures and numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Figure 1:
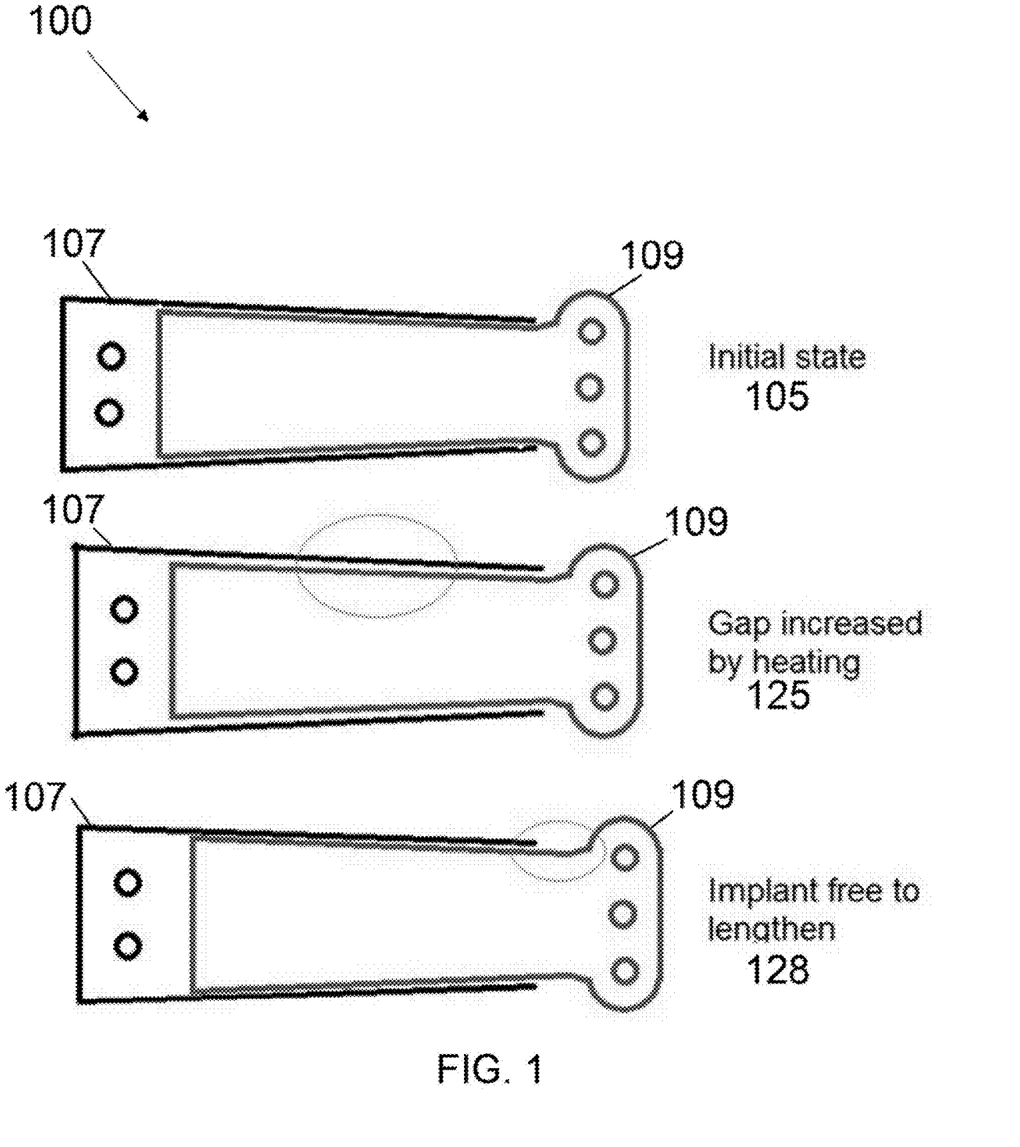
FIG. 1 is a schematic illustration of a metal plate in accordance with some embodiments of the present disclosure exhibiting a state change from an initial state to a lengthened state.

FIG. 1 schematically illustrates a non-limiting example of a plate 100 in accordance with the present disclosure in three different states. In the initial state 105, the inner surface of a first plate element 107 contacts the outer surface of a second plate element 109 in a complementary arrangement to restrict relative movement of the plate elements 107, 109. At least one of the plate elements 107, 109 contains a shape memory alloy (e.g., a nitinol alloy) capable of exhibiting the one-way shape memory effect. In some embodiments, only the first plate element 107 contains the shape memory alloy. In other embodiments, only the second plate element 109 contains the shape memory alloy. In further embodiments, both plate elements 107, 109 contain the shape memory alloy. It must be recognized that the plates in accordance with the present disclosure are not limited to two element configurations. For example, the plates may contain one, two, three, four, five, six, seven, eight, nine, ten, or more elements.

The plate element(s) may be secured to the same or different substrates. In some embodiments, the securing involves passing at least one fastening element (e.g., a screw, a pin, etc.) through at least one aperture in the plate element(s). Although the depicted apertures are circular, other shapes are expressly contemplated.

In some embodiments, the apertures may be rectangular (e.q. square) or other polygonal shapes. The apertures may be regularly or irregularly shaped.

In some embodiments, the substrate is a bone. The anchoring locations on the substrate may be on opposite sides of a fracture and/or growth plate.

The second state 125 is a transitional state achieved by stimulating the one-way shape memory effect (e.g., by heating). In the depicted transitional state 125, the first plate element 107 has undergone a shape change, thereby increasing a gap between the inner surface thereof and the outer surface of the second plate element 109. Such a gap permits but does not force a lengthening of the plate. In particular, whether and to what extent the plate will lengthen will depend on the substrate(s) to which the plate elements 107, 109 are affixed. For example, the plate elements 107, 109 may be secured to a patient's skeletal structure on different sides of a fracture and/or growth plate. Lengthening will be permitted to occur as the bone grows up until the inner surface of the first plate element 107 once again contacts the outer surface of the second plate element 109.

Non-limiting examples of heating include ultrasound heating, induction, diathermy, magnetic fields, etc.

In the third state 128, the plate has been permitted to lengthen until the inner surface of the first plate element 107 contacts the outer surface of the second plate element 109.

In biomedical embodiments, the materials contained in elements that are incapable of exhibiting the one-way shape memory effect include materials that are known in the art for being used inside the body, including but not limited to metals, alloys, ceramics, plastics, and composites. Non-limiting examples include titanium and its alloys, gold alloys, stainless steel, cobalt alloys (e.g., cobalt-chromium alloys), nickel-chromium alloys, composite materials, and polymers.

In some embodiments, one or more of the plate elements are coated to adjust a property thereof or an interface property (e.g., reduce or increase friction).

Figure 2:
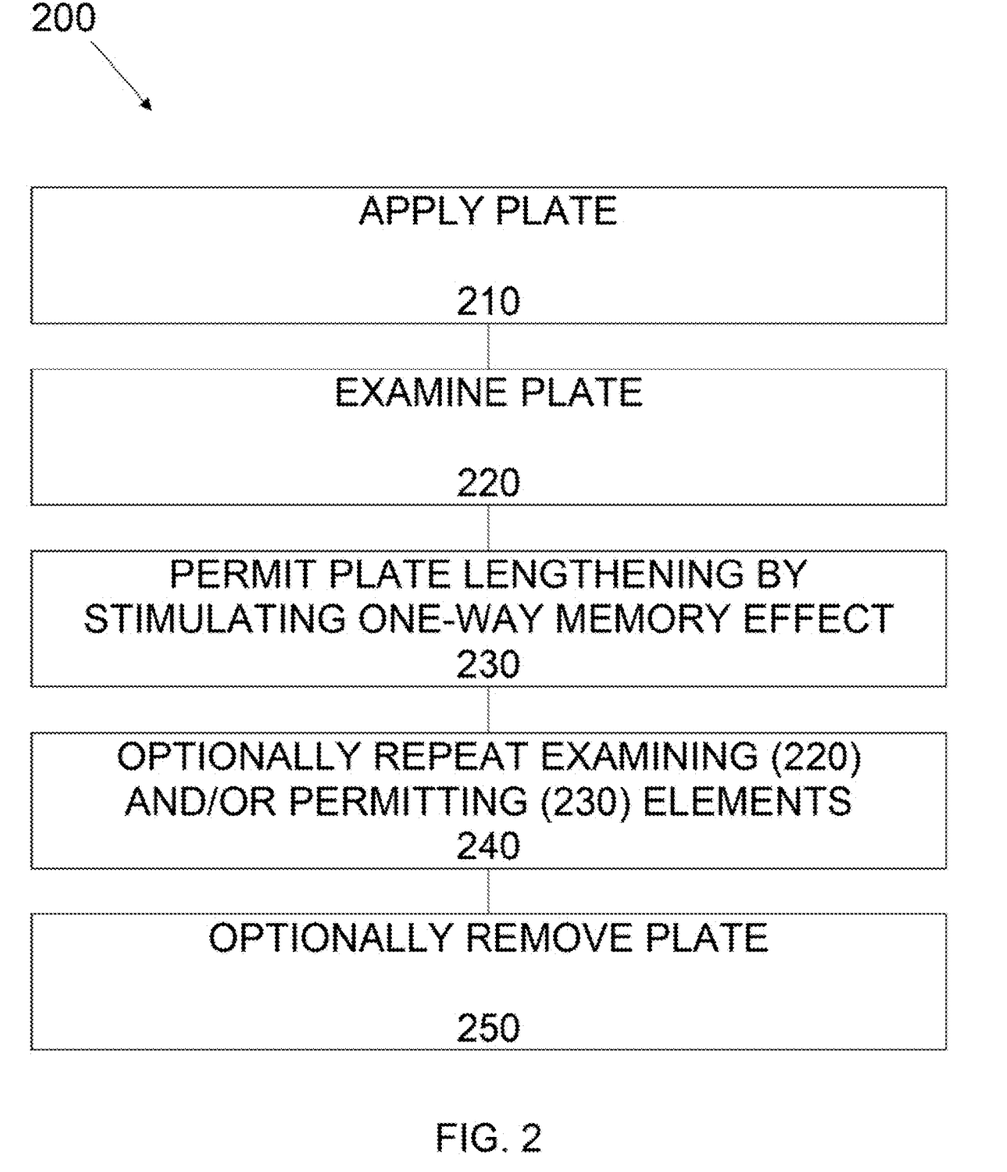
FIG. 2 is a flow chart illustrating a non-limiting embodiment of a first method in accordance with some embodiments of the present disclosure.

FIG. 2 is a flow chart of a first method 200 of lengthening a plate. The plate is first applied to a substrate 210. In medical applications, this may involve a surgery or other medical procedure. Subsequently, the plate may be examined 220 to ascertain whether lengthening should be permitted. Next, plate lengthening is permitted by stimulating a one-way shape memory effect 230. The examination 220 and/or permitting 230 may optionally and independently be repeated 240 a plurality (e.g., two, three, four, five, six, seven, eight, nine, ten, or more) times where a more incremental lengthening may be desirable. Finally, the plate may be removed 250 when a desired final condition is reached.

In the method depicted in FIG. 2, the plate is designed in a manner that the shape change does not force the bone to lengthen (since this could damage the bone's growth plate). Instead, the shape change will allow the bone's natural growth to determine how much the plate lengthens. This may be considered to be a passive process from the perspective of the plate.

Unforced lengthening may be useful for growth plate fracture fixation.

In some embodiments, lengthening is unforced and the plate includes a plurality of plate elements, where at least one plate element can exhibit the one-way shape memory effect and at least one plate element cannot exhibit the one-way shape memory effect.

In unforced lengthening, the molecules in the alloy are configured to widen a dimension of a plate component containing the alloy, thereby allowing one of the plate components to slide relative to the other plate component.

Figure 3:
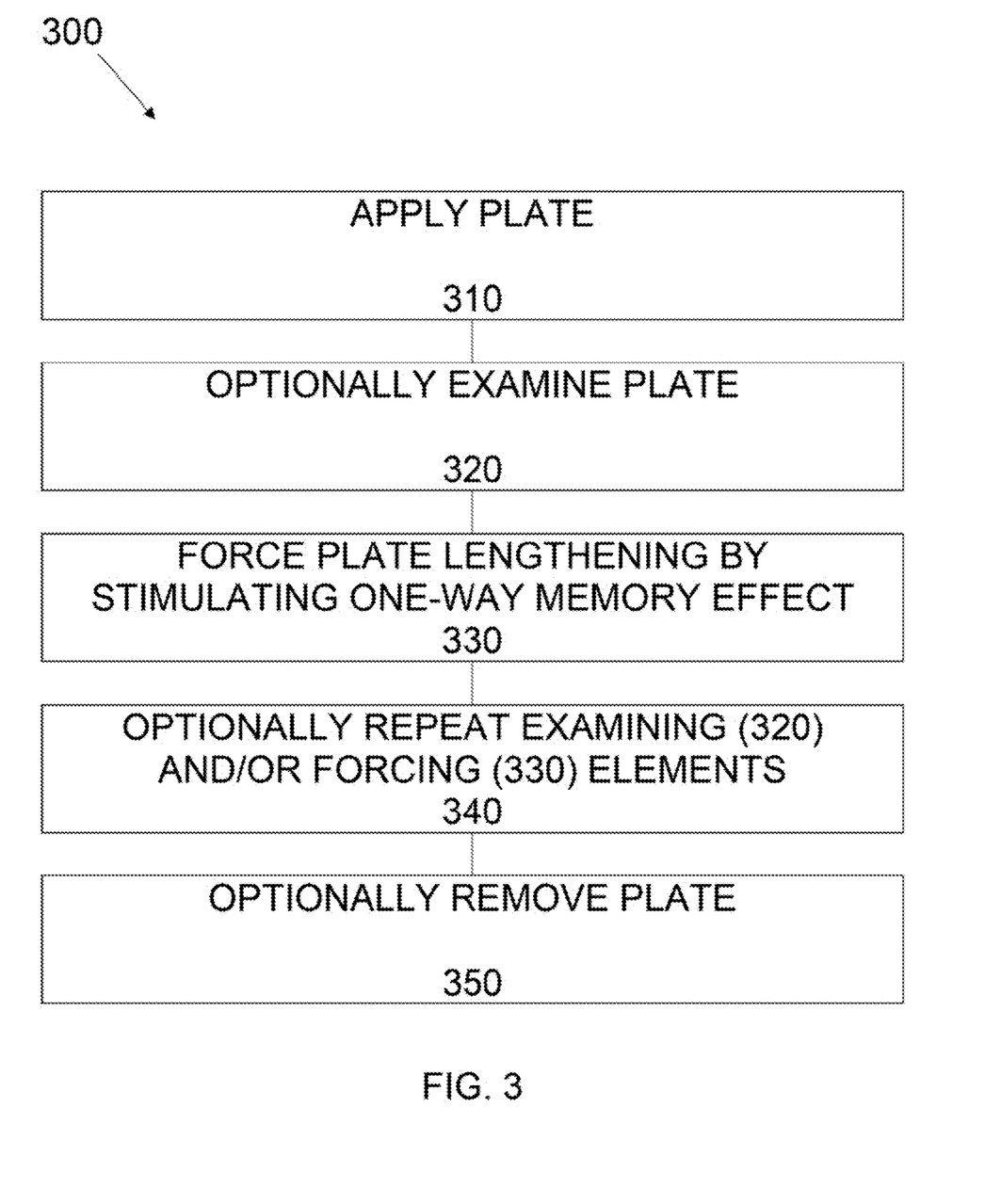
FIG. 3 is a flow chart illustrating a non-limiting embodiment of a second method in accordance with some embodiments of the present disclosure.

FIG. 3 is a flow chart of a second method 300 of lengthening a plate. The plate is first applied to a substrate 310. Subsequently, the plate may be examined 320 to ascertain whether lengthening should be forced. Next, plate lengthening is forced by stimulating a one-way shape memory effect 330. The examination 320 and/or forcing 330 may optionally and independently be repeated 340 a plurality (e.g., two, three, four, five, six, seven, eight, nine, ten, or more) times where a more incremental lengthening may be desirable. Finally, the plate may be removed 350 when a desired final condition is reached.

Forced lengthening may be helpful for applications such as the treatment of scoliosis patients. In people without scoliosis, the thoracolumbar spine is generally straight in the sagittal plane. Scoliosis is characterized by a lateral curvature and vertebral rotation. Scoliosis typically worsens with age in untreated patients and is associated with a number of different negative consequences. Current treatment methods include special braces, electrical stimulation, and/or surgeries.

In contrast to the applications involving growth plates described above (wherein bone lengthening will naturally occur by the biological activity in the region of the growth plate—if allowed), the lengthening in scoliosis applications may be forced if natural forces are insufficient for lengthening.

In forced lengthening, the molecules in the alloy are configured such that the plate component containing the alloy becomes longer under the application of heat, thereby forcing the bone to be stretched.

The force lengthening device may include a single plate element containing a material capable of exhibiting the one-way shape memory effect.

In scoliosis treatment methods of the present disclosure, the number of components may depend on the number of vertebra (e) to be corrected. The human body includes 33 vertebrae. In ascending order, these include four coccyx vertebrae, five sacral vertebrae, five lumbar vertebrae (L5-L1), twelve thoracic vertebrae (T12-T1), and seven cervical vertebrae (C7-C1). The treatment methods of the present disclosure may be applied within a single group of vertebrae (e.g., only lumbar, only thoracic, only cervical) or a plurality of groups (e.g., lumbar and thoracic, thoracic and cervical, lumbar thoracic, and cervical).

Within each group being treated, the methods may be applied to a single vertebra or a plurality of vertebrae.

Furthermore, when a plurality of vertebrae is being treated, these vertebrae may be adjacent or non-adjacent vertebrae.

Additionally, when a plurality of vertebrae is being treated, the treatment steps applied to each vertebra may be the same or different in one or more ways. For example, one vertebra may be subject to more treatment steps, a different heating profile, etc. depending on the shape of the patient's spine, the type of scoliosis, etc.

The vertebrae may be treated simultaneously or at different times. For example, alignment of multiple vertebrae may occur simultaneously. Alternatively, it is possible to wait until a first vertebrae is aligned prior to beginning the process of a second vertebrae.

It is also possible to sequence the treatment of vertebrae such that treatment of a first vertebrae that is further out of alignment may be initiated prior to the initiation of the treatment of a second vertebrae that is closer to proper alignment. This may allow the treatments to conclude at the same time even though the alignment of the first vertebrae takes longer or requires more incremental steps in a multi-step procedure.

In some embodiments, the treatment method involves a single component device placed on a vertebra. In other embodiments, a plurality of vertebrae are treated wherein each individual vertebra is associated with its own plate. For example, if the curvatures of three vertebrae need to be corrected, three plates may be utilized. It is also possible that one, some, or all of the vertebrae in a plurality of vertebrae being treated are associated with a plurality of plates. In non-limiting embodiments, a patient having an undesirable curvature in more than one plane (e.g., sagittal plane and frontal plane curvatures corresponding to scoliosis and kyphosis) could benefit from having two plates placed on a vertebral body.

In some embodiments, a patient with scoliosis is treated with multiple small plates placed on the sides of adjacent vertebrae. When these plates are forced to lengthen (using ultrasound or some other modality), each plate will force each vertebra to straighten.

In forced lengthening embodiments, the plate may be composed of a single plate element/piece being anchored at a plurality (at least two) locations such that the lengthening of the plate realigns at least one vertebra.

In general, the preferential orientation of martensitic variants plays an important role in the temperature-induced macroscopic strain change in nitinol alloys. There are several methods used to achieve this and many are described in the literature. For instance, a viable approach to promote this preferential orientation in our application is to place the plate device under uniaxial stress conditions (in the direction of the proposed elongation) and subject it to a number of heating and cooling cycles (while the stress is constant). During the heating and cooling, the device will be in the desired memory set-shape. This process completes the device training, and as such once it deforms during the surgical procedure (below the martensite transformation temperature) and gets heated (to a specific temperature through ultrasound heating, induction diathermy, etc.), it can always return to this memorized shape. Additional non-limiting details are discussed in Otsuka, K., & Wayman, C. M. (Eds.). (1999). *Shape memory materials*. Cambridge university press; and Murray, S. J., Farinelli, M., Kantner, C., Huang, J. K., Allen, S. M., & O'Handley, R. C. (1998). Field-induced strain under load in Ni—Mn—Ga magnetic shape-memory materials. *Journal of Applied Physics*, 83(11), 7297-7299, both of which are incorporated by reference herein.

Figure 4:
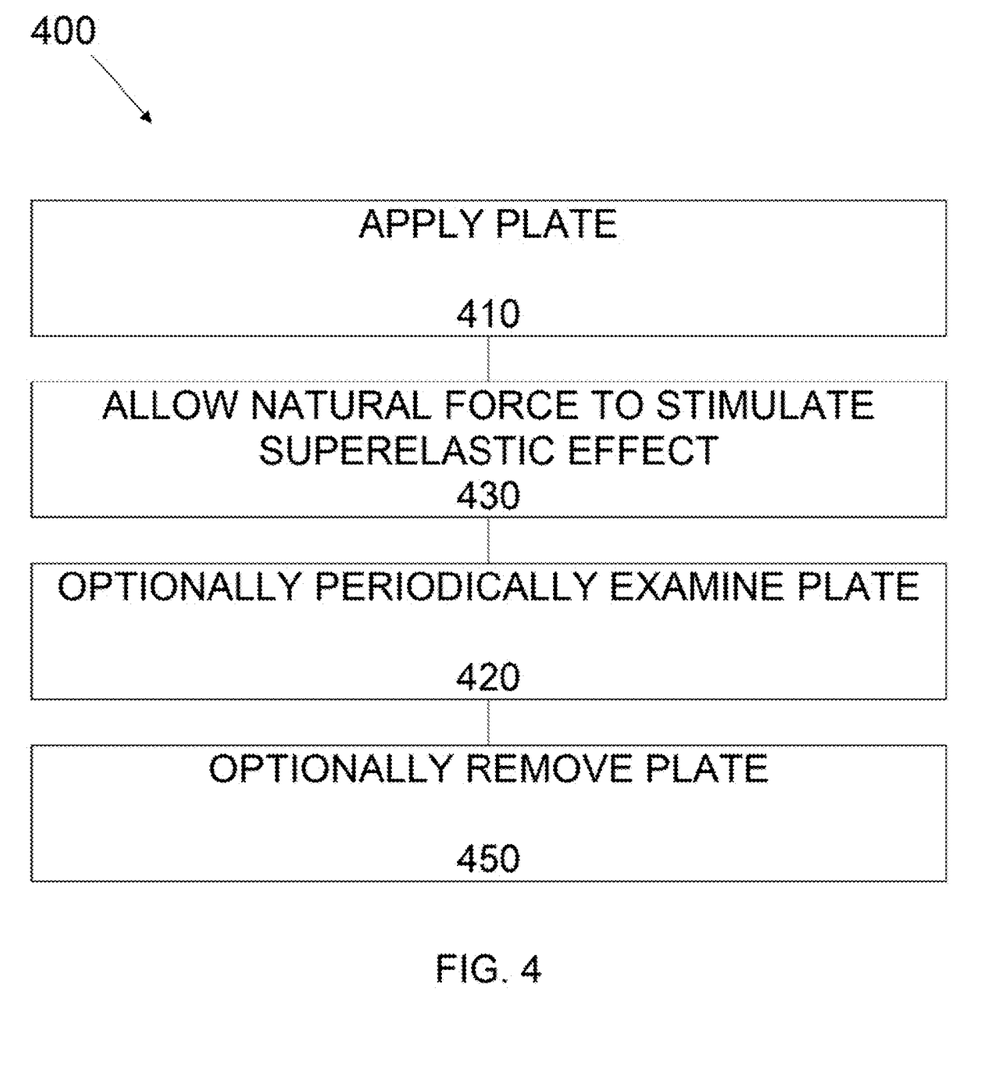
FIG. 4 is a flow chart illustrating a non-limiting embodiment of a third method in accordance with some embodiments of the present disclosure.

FIG. 4 is a flow chart of a third method 400 of lengthening a plate. The plate is first applied to a substrate 410. Subsequently, natural force(s) stimulate a superelastic effect in at least one element of the plate 430. The plate may be periodically examined 420. Finally, the plate may be removed 450 when a desired final condition is reached.

Superelasticity in nitinol works similar to a spring, but its elastic recoil is significantly greater than other materials. For the superelastic property, deformation may occur when a stress is applied (such as during bone growth). Utilizing superelasticity, a natural force from the body could cause the plate to elongate by a small amount.

The metal plate (e.g., orthopedic plate) contains a shape memory alloy capable of exhibiting the one-way shape memory effect. As used herein, the one-way shape memory effect occurs when the plate is stimulated in one way but not in the opposite way. For example, the one-way shape memory effect may permit at least one plate element to change shape when the plate is heated but the plate can retain its new shape when the temperature decreases after the heat is removed. In other words, the device is designed to always maintain the shape corresponding to the highest applied temperature.

The shape memory alloy may be a nickel-tin alloy. The nickel-tin alloy may contain from about 30 wt % to about 70 wt % tin, including from about 35 wt % to about 65 wt % tin, from about 40 wt % to about 60 wt % tin, from about 45 wt % to about 55 wt % tin, from about 46 wt % to about 54 wt % tin, from about 47 wt % to about 53 wt % tin, from about 48 wt % to about 52 wt % tin, from about 49 wt % to about 51 wt % tin, and about 50 wt % tin. The upper and lower limits from these different ranges may be combined in some embodiments.

The remainder of the nickel-titanium alloy may be nickel or nickel and impurities (e.g., unavoidable impurities). In other embodiments, minor amounts of other elements may be included in the alloy. The minor amounts may be 0.01 to 5 wt % of individual elements or the total amount of other elements, including 0.1 to 4 wt %, 0.2 to 3 wt %, and 0.5 to 2 wt %. Combinations of various upper and lower limits of these ranges are contemplated.

Non-limiting examples of possible alloying elements include one or more selected from aluminum, cobalt, copper, hafnium, iron, magnesium, niobium, palladium, platinum, and uranium.

Aluminum may increase the fatigue life of nickel-titanium alloys as well as the flexibility. Aluminum may also enable weight reduction which may be beneficial in a wide range of applications, including aerospace applications.

Cobalt may increase the stiffness of nickel-titanium alloys. Cobalt may be included where it is desirable to reduce the shape memory effect to some extent.

Copper may decrease the thermal hysteresis of nickel-titanium alloys.

Hafnium may function as a martensite enhancer (e.g., to increase the transition temperature).

Iron may function as a martensite suppressant (e.g., to decrease the transition temperature).

Magnesium may reduce the stiffness and improve the fatigue life of nickel-titanium alloys.

Niobium may widen the thermal hysteresis.

Palladium may function as a martensite enhancer (e.g., increasing the transition temperature).

Platinum may function as a martensite enhancer (e.g., increasing the transition temperature).

The plate may utilize the shape memory effect to allow a portion of the plate to gradually lengthen when it is heated (e.g., through the application of ultrasound). During the shape memory effect, there is a thermoelastic transformation from martensite to austenite, which allows a previously deformed material to return to an original shape after heating. This can occur in a single step or in multiple steps, e.g., by heating the plate from body temperature to 38° C., and then (later) to 39° C., up to temperatures of 41° C. However, larger and smaller increments are also contemplated. For example, the temperature increase may be in the range of 0.01° C. to 2° C., including from about 0.05° C. to about 1.5° C., from about 0.1° C. to about 1° C., from about 0.2° C. to about 0.9° C., from about 0.3° C. to about 0.8° C., from about 0.4° C. to about 0.7° C., and from about 0.5° C. to about 0.6° C. The upper and lower limits from these different ranges may be combined in some embodiments.

The number of steps may be in the range of from 1 to about 5, including from 1 to 3. Embodiments with 1, 2, 3, 4, and 5 steps are expressly contemplated. However, more than 5 steps are also expressly contemplated. The number of steps may be determined by dividing the difference between initial and final temperature by the temperature increase.

Each increase in temperature can result in the plate changing its shape slightly.

Non-limiting examples of suitable applications include treatment of fractures (e.g., pediatric orthopedic fractures in multiple locations throughout the body), corrective treatments for scoliosis (curvature of the spine), and correcting bone deformities. However, the plates and methods of the present disclosure may more generally be useful in any application where gradual lengthening of a metal plate is desired.

Non-limiting examples of the plates of the present disclosure include self-adjusting, obviates the need for multiple surgeries, is stronger than polymers having shape-memory properties, can allow a bone to lengthen upon non-invasive stimulation (e.g., heating) rather than force lengthening in some embodiments, and capability of designing the implant to force lengthening (e.g., for bone correction).

The following examples are provided to illustrate the devices and methods of the present disclosure. The examples are merely illustrative and are not intended to limit the disclosure to the materials, conditions, or process parameters set forth therein.

EXAMPLES

Figure 5:
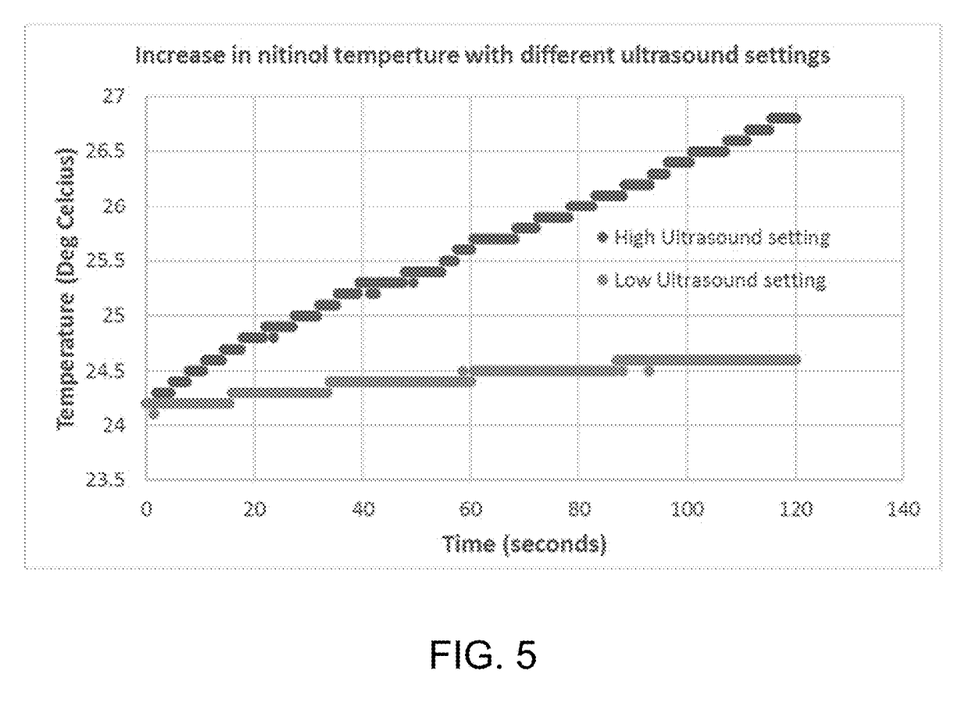
FIG. 5 is a graph showing the increase in nitinol temperature with different ultrasound settings.

Nitinol rods were subjected to ultrasound at high and low settings. For both settings, subjecting the rods to ultrasound caused temperature increases that were dependent on both ultrasound setting and duration of applying ultrasound to the implant. FIG. 5 is a graph illustrating that, in both cases, the temperature of nitinol increases in a predictable manner. Results for the high ultrasound setting are shown in the graph above the results of the low ultrasound setting.

Prophetic Examples

Ultrasound sonicators (e.g., Sonicator 740 Ultrasound, Dynatron 150 plus Ultrasound, Sonicator Plus 930 Ultrasound, and Dynatron 706 Ultrasound) will be calibrated to activate the memory effect in Nitinol. Measurements may include the increase in rod lengths, and temperature per increase in ultrasound waves.

Nitinol samples will be obtained. A rod will be placed in standard pedicle screw construct and a layer of tissue (consisting of pork muscle and skin obtained from a local butcher) will be wrapped around the construct to study the transfer of heat from an Ultrasound source to the rod implant as the sound waves penetrate through the skin and the muscles. To simulate effects of variations in body temperatures, and tissue properties on the device performance, different pork tissues will be separately frozen (using ice) or heated (using water bath) before and after the ultrasound exposure. This procedure will be repeated for the four different therapeutic Ultrasound machines to obtain the best outcome. The related ultrasound data will be visualized as the rod lengthens as a function of temperature changes (between 36 and 41 degrees Celsius) as well as the duration of ultrasound application.

Moreover, the Instron universal testing machine with control and data acquisition software will be used to conduct axial, torsional, 'three-point' and 'four-point' bending testing of the Nitinol rods. Under the axial conditions, measurements of the force-temperature relations under constant displacements and displacement-temperature relations under constant forces will be made.

Static and dynamic tests will be conducted to enable the evaluation of variations in the durability, stiffnesses, and stresses developed in the rod under thermomechanical loading conditions, as well as to validate any finite element model predicted results.

This written description uses examples to describe the disclosure, including the best mode, and to enable any person skilled in the art to make and use the disclosure. Other examples that occur to those skilled in the art are intended to be within the scope of the present disclosure if they have structural elements that do not differ from the same concept, or if they include equivalent structural elements with insubstantial differences. It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A plate comprising:
a first plate element; and
a second plate element;
wherein at least one of the first plate element and the second plate element comprises a shape memory alloy capable of exhibiting a one-way shape memory effect;
wherein the first plate element and the second plate element can be arranged in a fixed, complementary relationship at a first temperature;
wherein the first plate element and the second plate element can be permitted to move relative to one another when at least one of the first plate element and the second plate element is heated to a second temperature;
wherein the first plate element and the second plate element are not forced to move relative to one another when at least one of the first plate element and the second plate element is heated to the second temperature;
wherein the second temperature exceeds the first temperature; and
wherein:
at the first temperature, an inner surface of the first plate element contacts an outer surface of the second plate element in a complementary arrangement to restrict relative movement of the first plate element and the second plate element; and
heating to the second temperature results in a shape change thereby increasing a gap between the inner surface of the first plate element and the outer surface of the second plate element to permit but not force lengthening of the plate.

2. The plate of claim 1, wherein the plate is an orthopedic plate.

3. The plate of claim 2, wherein the shape memory alloy is a nickel-titanium alloy.

4. The plate of claim 3, wherein the nickel-titanium alloy comprises hafnium, palladium, and/or platinum.

5. The plate of claim 3, wherein the nickel-titanium alloy comprises copper or niobium.

6. The plate of claim 3, wherein the nickel-titanium alloy comprises aluminum.

7. The plate of claim 3, wherein the nickel-titanium alloy comprises cobalt.

8. The plate of claim 3, wherein the nickel-titanium alloy comprises iron and/or magnesium.

* * * * *